(12) United States Patent
Ackermanns et al.

(10) Patent No.: US 7,563,369 B2
(45) Date of Patent: *Jul. 21, 2009

(54) DEVICE FOR RECEIVING AND SEPARATING CHIPS AND COOLING LIQUID DISCHARGED FROM MACHINE TOOLS (DRIVE)

(75) Inventors: Leo J. P. Ackermanns, Schin op Geul (NL); Wim R. E. Arnts, Kerkrade (NL); Rene M Sieben, Sittard (NL); Rimmond H. B. Souren, Meersen (NL)

(73) Assignee: Mayfran International B.V., Landgraaf (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,600

(22) Filed: Oct. 2, 2006

(65) Prior Publication Data

US 2007/0029248 A1 Feb. 8, 2007

Related U.S. Application Data

(63) Continuation of application No. 10/492,285, filed on Apr. 9, 2004, now Pat. No. 7,115,200.

(51) Int. Cl.
*B23Q 11/00* (2006.01)
*B01D 33/06* (2006.01)
*B01D 33/073* (2006.01)
*B01D 36/04* (2006.01)

(52) U.S. Cl. .................. 210/297; 210/298; 210/402
(58) Field of Classification Search ............. 210/297, 210/298, 402
See application file for complete search history.

(56) References Cited

U.S. PATENT DOCUMENTS

| | | | | |
|---|---|---|---|---|
| 3,773,166 | A * | 11/1973 | Nowacki | 198/493 |
| 4,407,720 | A * | 10/1983 | Bratten | 210/777 |
| 4,421,645 | A | 12/1983 | Creps et al. | |
| 4,670,143 | A * | 6/1987 | Bratten | 210/234 |
| 4,735,730 | A * | 4/1988 | Bratten | 210/741 |
| 4,932,515 | A * | 6/1990 | Stohr | 198/822 |
| 5,167,839 | A | 12/1992 | Widmer et al. | |
| 5,871,643 | A | 2/1999 | Ota | |
| 5,992,642 | A * | 11/1999 | Ota | 210/396 |
| 6,332,983 | B1 | 12/2001 | Tashiro et al. | |

(Continued)

FOREIGN PATENT DOCUMENTS

DE 10223290 12/2003

(Continued)

OTHER PUBLICATIONS

International Search Report from PCT/EP03/05245, mailed Aug. 21, 2003.

*Primary Examiner*—Thomas M Lithgow
(74) *Attorney, Agent, or Firm*—Calfee, Halter & Griswold LLP

(57) ABSTRACT

A device for receiving and separating chips and cooling liquid collecting on machine tools. The device may include a transport element that is guided along a filter drum at a radial distance from the latter on guide rails, and cooperating driver elements acting only in the circumferential direction on the filter drum and arranged in each case at a distance from one another are provided on the transport element and on the filter drum.

7 Claims, 6 Drawing Sheets

U.S. PATENT DOCUMENTS 7,115,200 B2    10/2006    Ackermanns et al.

FOREIGN PATENT DOCUMENTS

| EP | 1474269 | 11/2004 |
|----|---------|---------|
| JP | 09-075622 | 3/1997 |
| JP | 2000-167317 | 6/2000 |
| JP | 2000 202215 | 7/2000 |
| JP | 2000 300914 | 10/2000 |
| JP | 2002 102608 | 4/2002 |
| WO | WO 03/099513 | 12/2003 |

* cited by examiner

DEVICE FOR RECEIVING AND SEPARATING CHIPS AND COOLING LIQUID DISCHARGED FROM MACHINE TOOLS (DRIVE)

RELATED APPLICATIONS

This is a continuation of U.S. patent application Ser. No. 10/492,285 filed Apr. 9, 2004, for DEVICE FOR RECEIVING AND SEPARATING CHIPS AND COOLING LIQUID (DRIVE) COLLECTING ON MACHINE TOOLS MODULAR FLUID SPRAY GUN, set to issue on Oct. 3, 2006 as U.S. Pat. No. 7,115,200, the entire disclosure of which is fully incorporated herein by reference.

BACKGROUND AND SUMMARY

The invention relates to a device for receiving and separating chips and cooling liquid collecting on machine tools, the cooling liquid being returned for reuse and the chips being discharged, having a receiving tank for receiving the chips and the cooling liquid, a rising guide section adjoining the receiving tank, an elevated delivery section adjoining the guide section, a chain-like closed transport element which, at least in the region receiving the chips and the cooling liquid and in the delivery section, is guided via deflecting elements, of which at least one is coupled to a rotary drive, and a rotatably mounted filter drum which is in drive connection with the transport element.

In a known device of this type (U.S. Pat. No. 6,332,983), a transport element is directed partly around the filter drum and directly causes this drum to rotate in the process. It follows from this that the bearings of the drum are radially loaded by the transport element, that is to say that the wear on these bearings increases. Furthermore, as a result of the direct drive connection between transport element and filter drum, the circumferential speed of the filter drum must always correspond to the speed of the transport element.

The object of the present invention, then, is to reduce the bearing load of the filter drum in a device of the type mentioned at the beginning and to make it possible for a filter cake to form on the outside on the circumference of the drum despite a continuously revolving transport element, this filter cake positively influencing the filter effect.

This object is achieved according to the invention in that the transport element is guided along the filter drum at a radial distance from the latter on guide rails, and in that cooperating driver elements acting only in the circumferential direction on the filter drum and arranged in each case at a distance from one another are provided on the transport element and on the filter drum.

In this case, the pressure exerted during the deflection of the transport element in the region of the filter drum is absorbed by the guide rails and the bearings of this drum are relieved. At the same time, the filter drum does not automatically follow the movement of the transport element. On the contrary, the arrangement of the cooperating driver elements on the filter drum on the one hand and on the transport element on the other hand determines the phases in which a rotation takes place and, on the other hand, in which the filter drum is stopped. During these stop periods, a filter cake can form in a perfectly desirable manner on the lateral surface of the filter drum, this filter cake increasing the filter effect. In a manner known per se, this filter cake can be dissolved from the inside of the filter drum by jets of filtered cooling liquid in order not to allow the thickness of the filter cake formed to increase too much.

The driver elements on the filter drum are expediently designed as projecting pins and the driver elements on the transport element are expediently designed as projecting stops cooperating with the pins.

Furthermore, provision is made according to the invention for the driver elements to have a crank mechanism, the crank of which is in drive connection with the transport element and the rod of which carries a driver element which engages in the tooth system of a ratchet wheel coupled to the filter drum. In this case, the crank radius of the crank mechanism can be adjustable. As a result, the angle by which the filter drum is advanced during a revolution of the crank can be determined.

Both drive variants can in each case be attached on one side or on both sides of the filter drum. On the one hand, the circumferential speed can be increased by the drives alternately driving the drum on both sides; on the other hand, torsional forces are avoided during synchronous drive of both drum sides.

Furthermore, the device according to the invention may be designed in such a way that the transport element is a scraper chain guided at its two sides in the housing of the device and having scraper webs running transversely to the transport direction and projecting downwards in the region of the bottom strand.

Furthermore, the invention provides for the transport element to be a hinged belt conveyor guided at its two sides in the housing of the device and having supporting sections running transversely to the transport direction.

BRIEF DESCRIPTION OF THE DRAWINGS

A few embodiments of the device according to the invention are described below with reference to drawings, in which.

DETAILED DESCRIPTION

Figure 1:
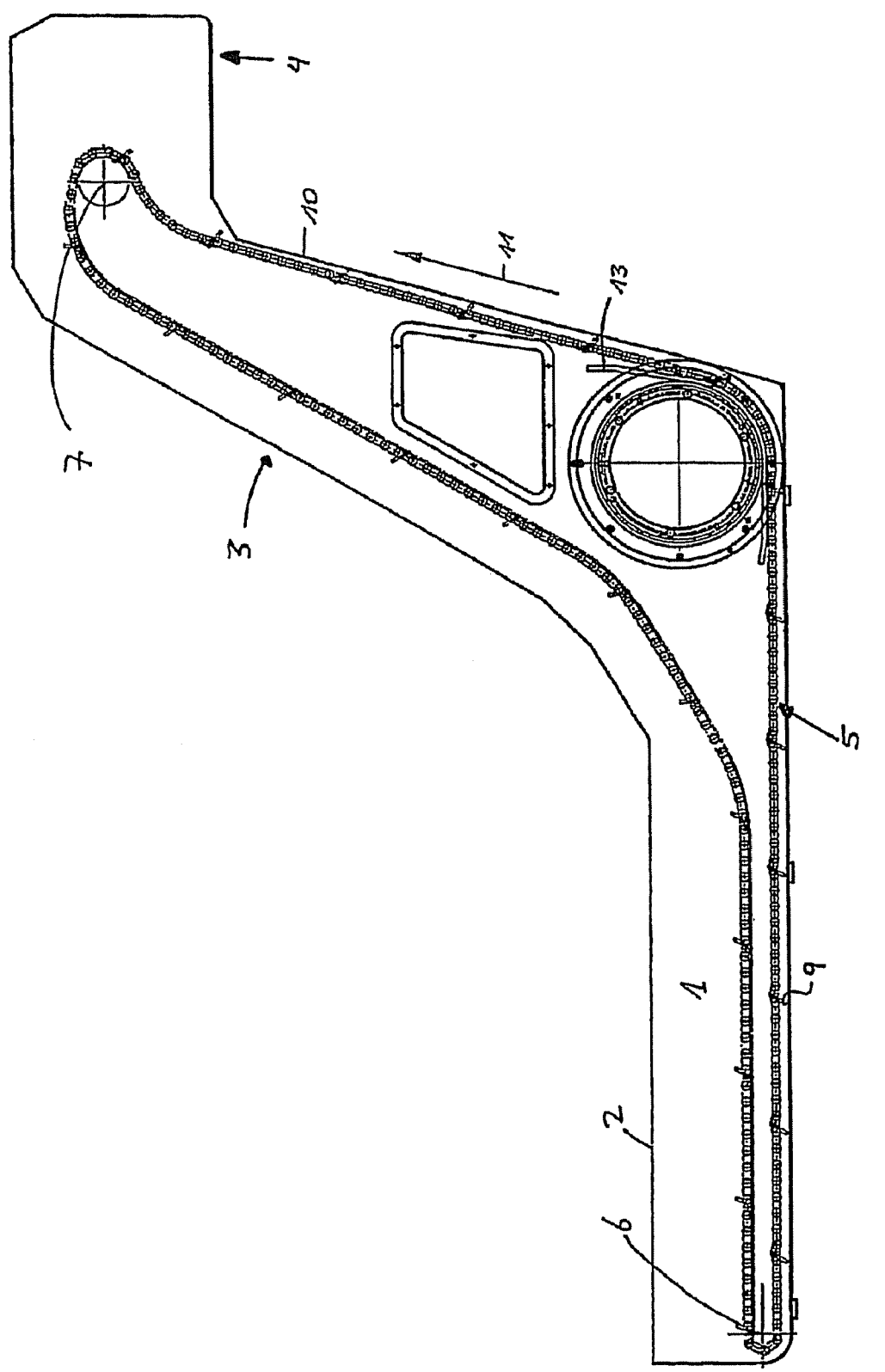
FIG. 1 shows a side view of a device according to the invention having a scraper chain.

FIG. 1 shows the side view of an embodiment of the device according to the invention having a receiving tank 1 which is open at the top and which receives chips and cooling liquid collecting on machine tools. This receiving tank has an overflow edge 2. Adjoining the receiving tank is a rising guide section 3, which merges into an elevated delivery section 4.

Here, a scraper chain roller-guided on both sides is provided as transport element. This scraper chain is guided around a bottom deflecting element 6 at the end of the receiving tank 1 and runs in the region of the delivery section 4 around a top deflecting element 7, which is coupled to a drive (not shown). It carries scraper elements which are arranged at a distance apart and which project downwards in the region of the bottom strand, that is to say in the direction of the bottom of the receiving tank 1, or towards the side wall 10 of the rising section 3. The transport direction of the scraper chain 1 is indicated by the arrow 11.

A filter drum 12 which is rotatably mounted in the housing of the device is provided. The scraper chain runs around the filter drum at a radial distance which is determined by a guide rail 13. Driver elements are provided on the scraper chain 5 and on the filter drum 12, these driver elements gradually advancing the filter drum 12 intermittently during operation of the device.

Figure 2:
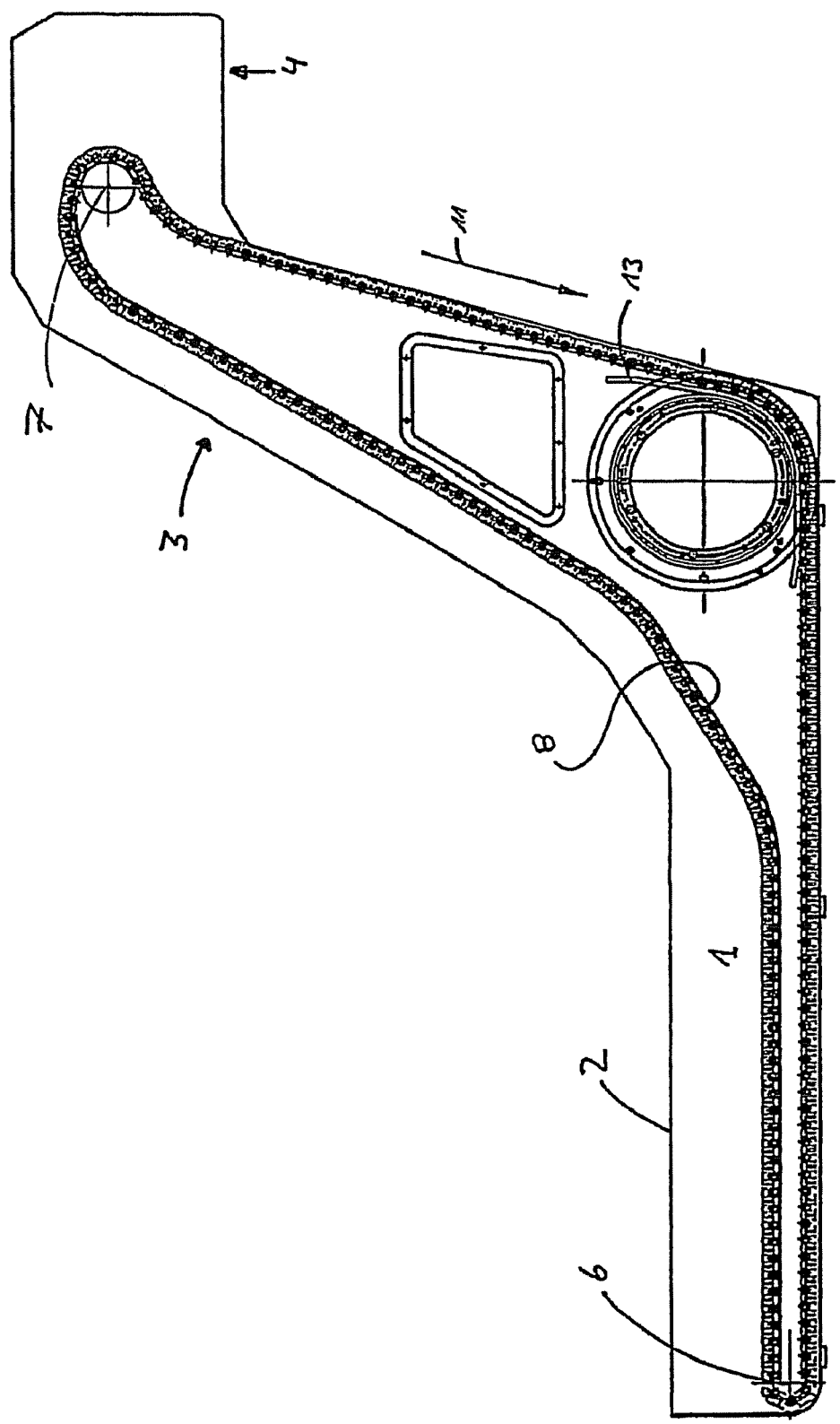
FIG. 2 shows a side view of a device according to the invention having a hinged belt conveyor.

The embodiment according to FIG. 2 differs from that according to FIG. 1 merely in the fact that the transport element used is a hinged belt 14 instead of a scraper belt, this hinged belt 14, in contrast to a scraper belt, receiving and carrying the material to be transported on its top side. In this case, the hinged belt 14 is covered on the underside of its top strand with a baffle 8.

Figure 3:
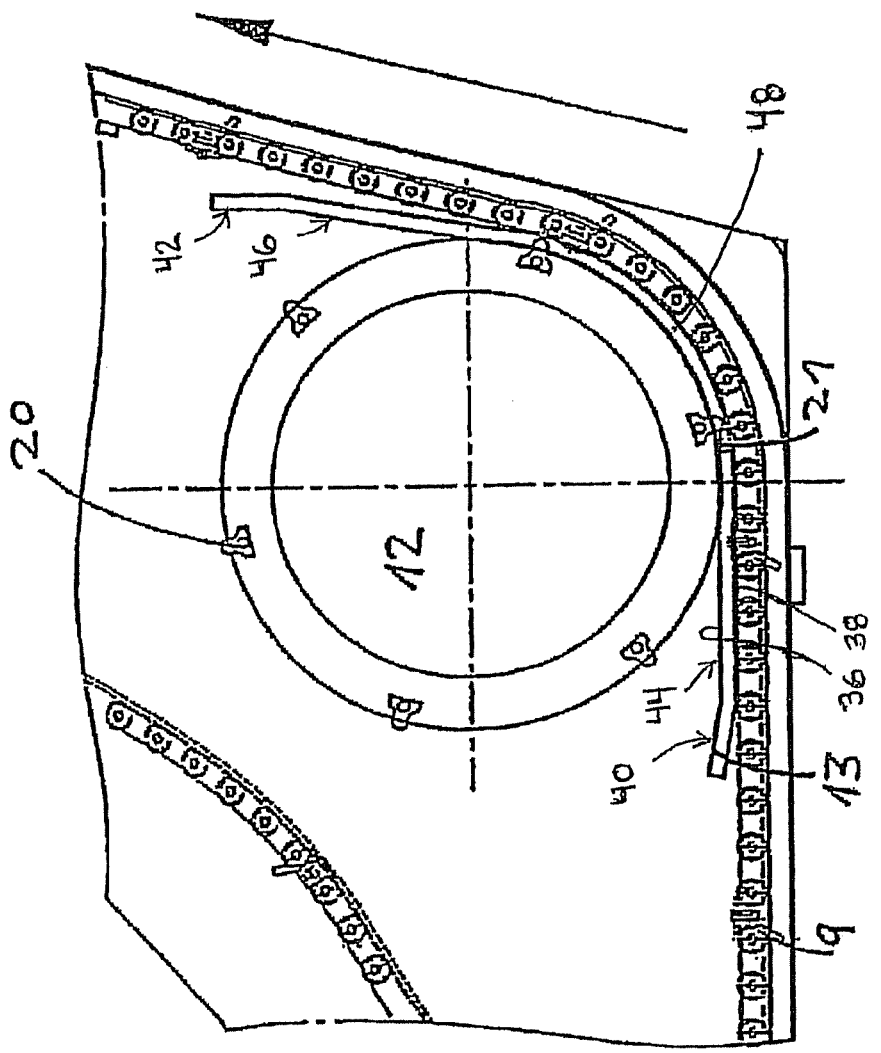
FIG. 3 shows a detail view of a filter drum in combination with a scraper chain.

FIG. 3 shows pins 20, which are arranged equidistantly on the filter drum 12 and cooperate with stops 21, which 15 are fastened to the scraper chain 5.

Furthermore, the web-shaped scraper elements 9 and the stops 21 may form a constructional unit.

Figure 4:
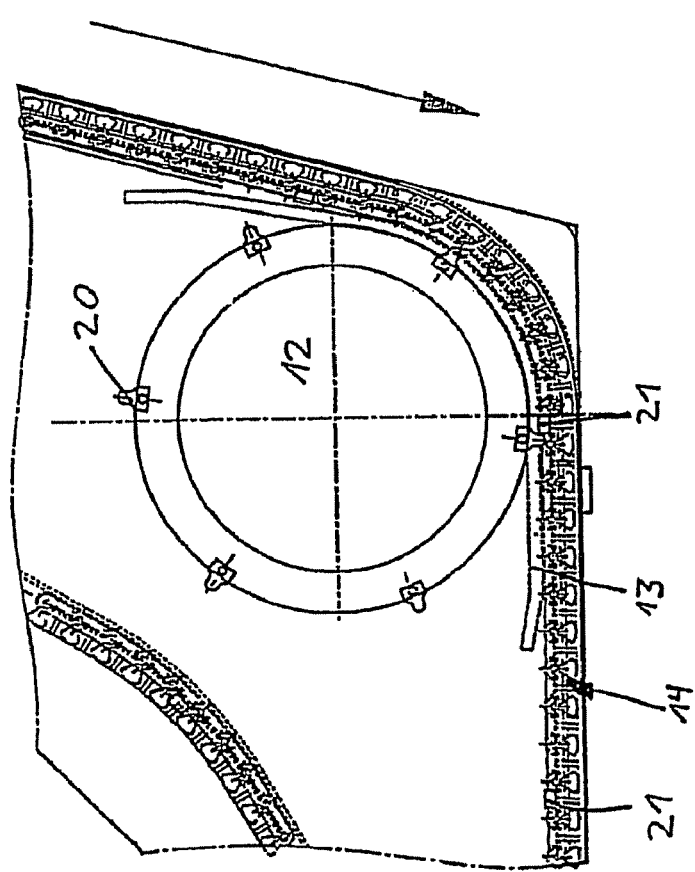
FIG. 4 shows a detail view of a filter drum in combination with a hinged belt conveyor.

FIG. 4 shows an embodiment according to FIG. 3 with a hinged belt 14.

Figure 5:
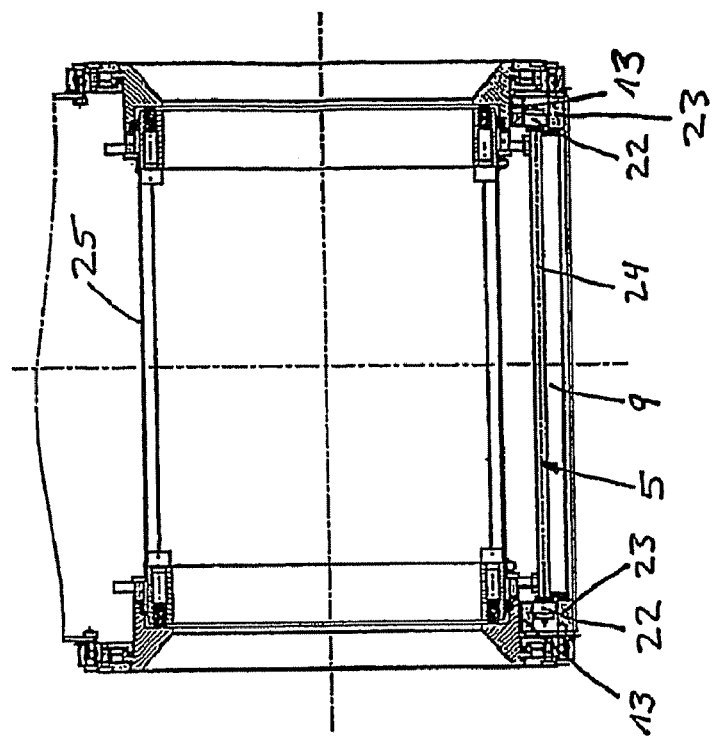
FIG. 5 shows an axial section through a filter drum designed according to the invention for drum drives according to FIGS. 3 and 4.

FIG. 5 shows a section through a filter drum 12 having a hinged belt 14, the lateral rollers 22 of which run in guides 23. Furthermore, of the hinged belt 14, a retaining rod 24 is shown, on which a web-like scraper element 9 projecting downwards sits. The filter drum 12 is of identical design towards its two ends and is rotatably mounted in the housing of the device. It is open on both sides and therefore forms on both sides an outlet for the cleaned cooling liquid passed through the filter wall 25.

The embodiment according to FIG. 6 differs from that described with reference to FIGS. 3 and 4 in that the driver elements are formed by a crank mechanism 26. This mechanism has a gearwheel 27 which is rotatable about a fixed axis (not shown). In this case, the gearwheel engages between the rollers of the scraper chain 5, which interacts at the rear with a support 28, so that the scraper chain 5 cannot give way to the action of the gearwheel 27.

A crank pin 29 sits on the gearwheel 27 eccentrically to the axis of the gearwheel and carries a push rod 30, and sitting in turn on the end of the latter is a driver element 31, which engages in the tooth system of a ratchet wheel 32.

During operation of the scraper chain 5, the rotation of the gearwheel 27, via the crank pin 29, successively causes the ratchet wheel 32 to advance by at least one tooth in each case during each complete rotation of the gearwheel 27.

By radial displaceability of the crank pin 29 in the gearwheel 27, the stroke of the toothed rack 30 can be varied, so that the ratchet wheel 32 can be moved by more than one tooth during a rotation of the gearwheel 27.

A particular advantage of this embodiment can be seen in the fact that, here, all the elements for the gradual advance of the filter drum are accommodated in a region of the device in which contamination can be expected only to a relatively small extent.

Figure 6:
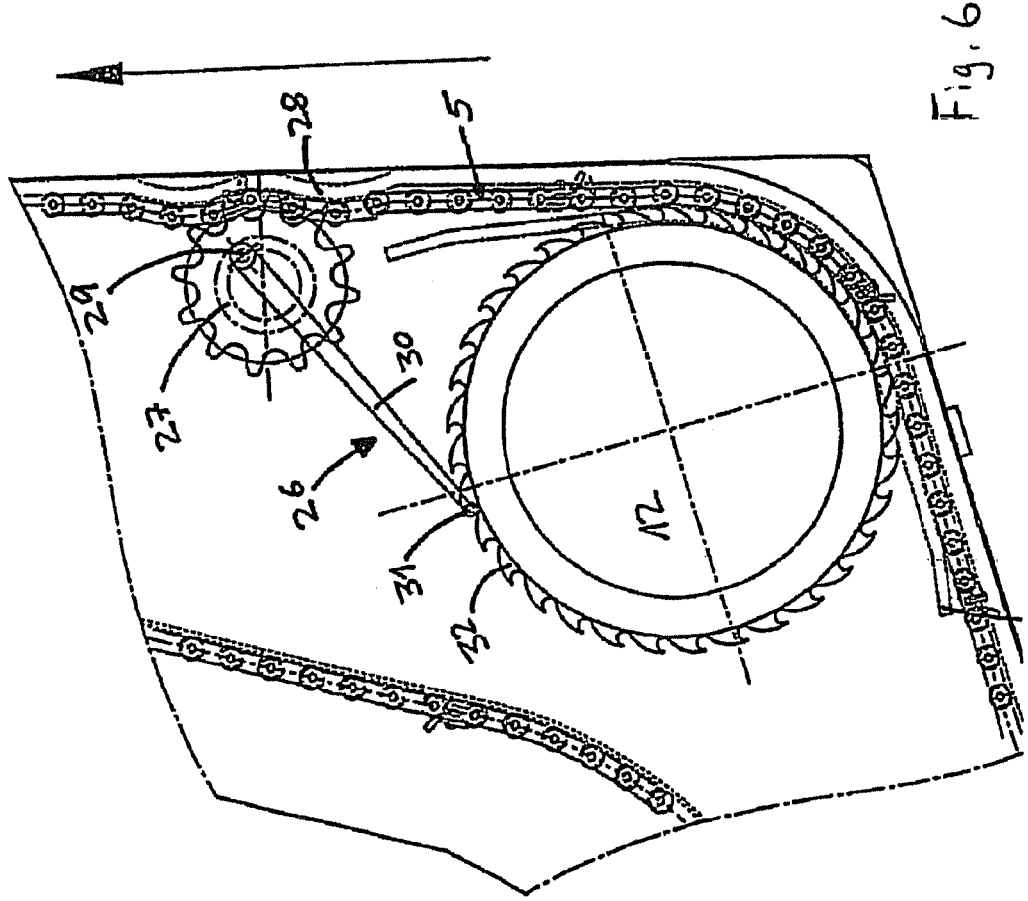
FIG. 6 shows a detail view of a further embodiment with crank drive of the filter drum in combination with a scraper chain.
Figure 7:
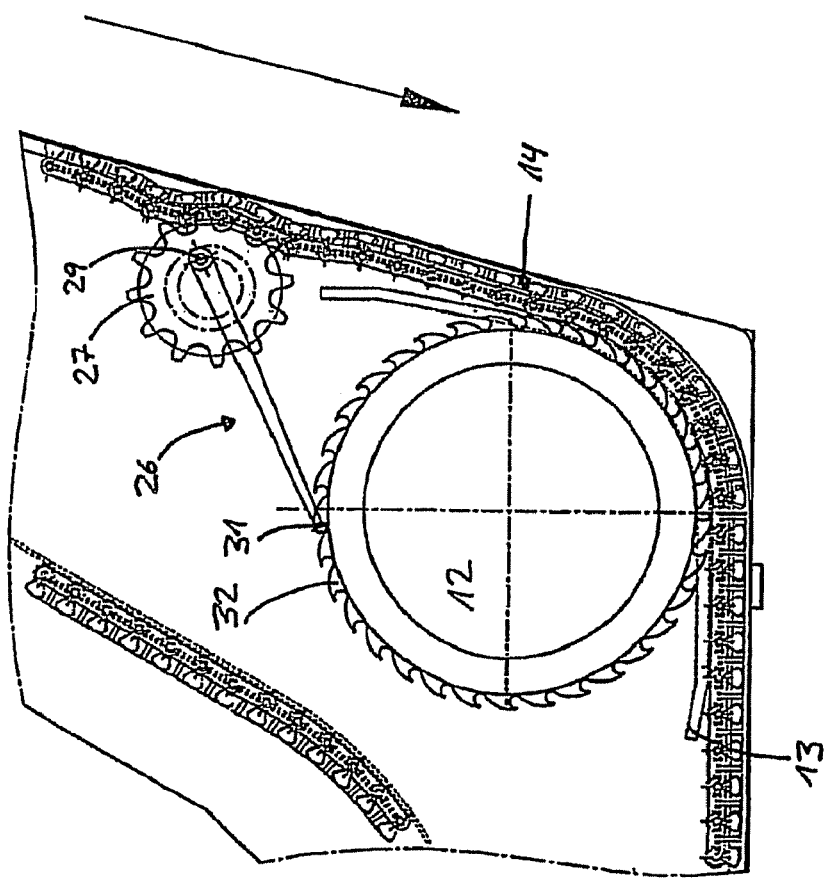
FIG. 7 shows a detail view of a further embodiment with crank drive of the filter drum in combination with a hinged belt conveyor.

FIG. 7 shows the embodiment according to FIG. 6 with the exception that the transport element here is a hinged belt conveyor.

Figure 8:
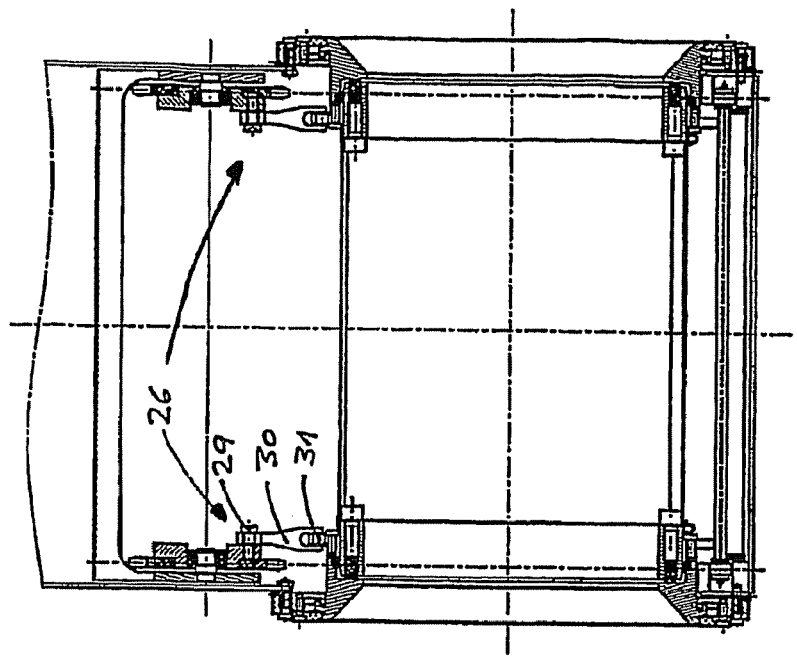
FIG. 8 shows an axial section through a filter drum designed according to the invention with a drum drive in accordance with the embodiments according to FIG. 6 or 7.

FIG. 8 shows a section through the filter drum and contiguously through the crank mechanism in accordance with the device shown in FIG. 7.

The invention claimed is:

1. A device for receiving and separating chips and cooling liquid collecting on machine tools, the cooling liquid being returned for reuse and the chips being discharged, comprising:
    a receiving tank for receiving the chips and the cooling liquid, a rising guide section adjoining the receiving tank;
    an elevated delivery section adjoining the guide section;
    a transport element which, at least in a first region, is guided via at least first and second deflecting elements, wherein at least one of the first and second deflecting elements is coupled to a rotary drive; and
    a rotatably mounted filter drum that is in drive connection with the transport element;
    at least one guide element positioned to prevent the transport element from moving radially toward the filter drum; and
    a crank mechanism having a crank and a rod, wherein the crank is in drive connection with the transport element and the rod engages a tooth system of a ratchet wheel coupled to the filter drum.

2. The device according to claim 1 wherein the crank radius of the crank mechanism is adjustable.

3. The device according to claim 1 wherein the transport element comprises a scraper chain guided on two sides in the housing of the device and having scraper webs running transversely to the transport direction and projecting downwards in the region of the bottom strand.

4. The device according to claim 3 wherein the driver elements associated with the transport element are provided on both sides of the transport element.

5. The device according to claim 1 wherein the transport element comprises a hinged belt conveyor guided on two sides in the housing of the device and having supporting sections running transversely to the transport direction.

6. The device according to claim 5 wherein the driver elements associated with the transport element are provided on both sides of the transport element.

7. A device for receiving and separating chips and cooling liquid collecting on machine tools, the cooling liquid being returned for reuse and the chips being discharged, comprising:
    a receiving tank for receiving the chips and the cooling liquid, a rising guide section adjoining the receiving tank;
    an elevated delivery section adjoining the guide section;
    a transport element which, at least in a first region, is guided via at least first and second deflecting elements, wherein at least one of the first and second deflecting elements is coupled to a rotary drive;
    a rotatably mounted filter drum that is in drive connection with the transport element;
    at least one guide element positioned to keep the transport element at a radial distance away from the filter drum; and
    a crank mechanism having a crank and a rod, wherein the crank is in drive connection with the transport element and the rod engages a tooth system of a ratchet wheel coupled to the filter drum, and wherein the crank comprises a gearwheel that engages rollers on the transport element.

* * * * *